Nov. 28, 1933.　　　O. A. BANNER　　　1,936,574

ROLLER COUPLING

Filed Dec. 4. 1931　　　2 Sheets-Sheet 1

INVENTOR
Otto A. Banner
BY C. Campbell Hinrichs

ATTORNEY

Nov. 28, 1933.　　　O. A. BANNER　　　1,936,574
ROLLER COUPLING
Filed Dec. 4, 1931　　　2 Sheets-Sheet 2
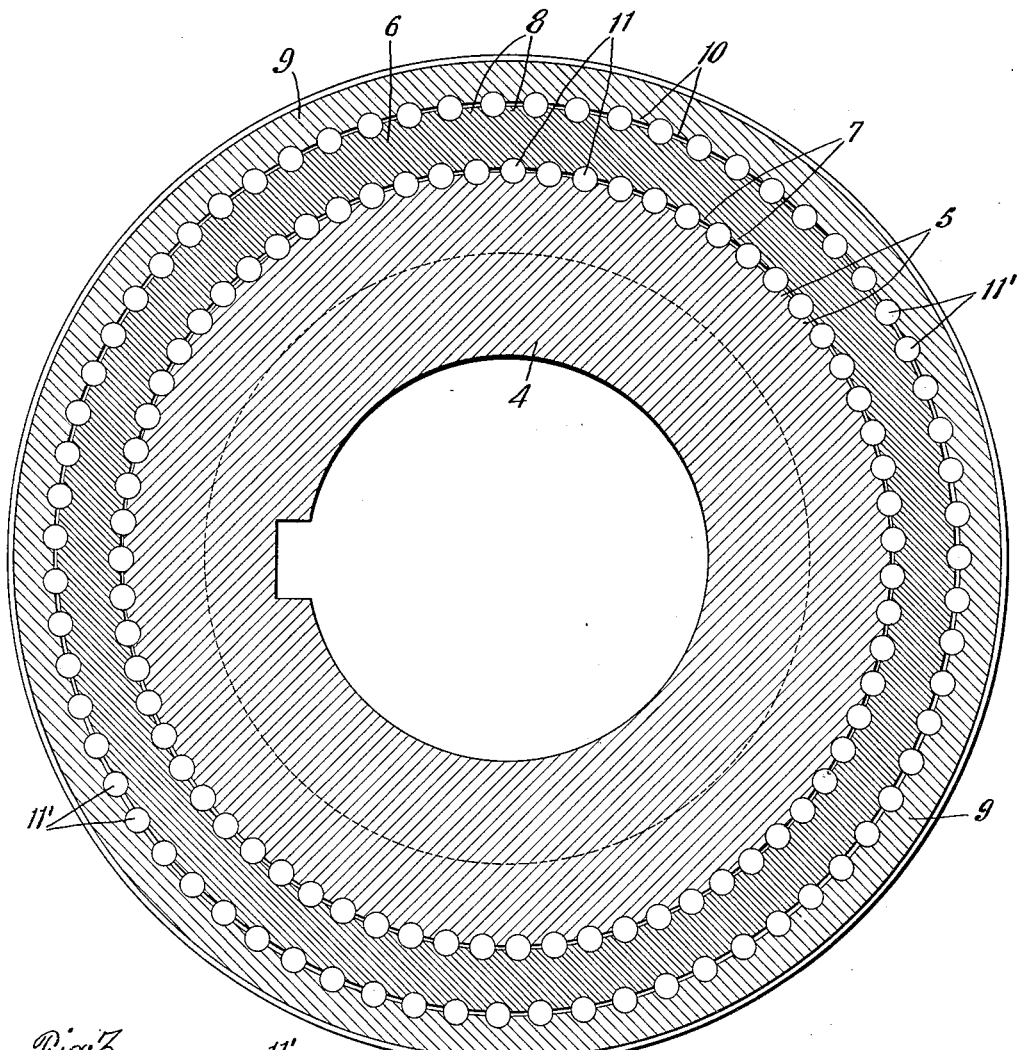
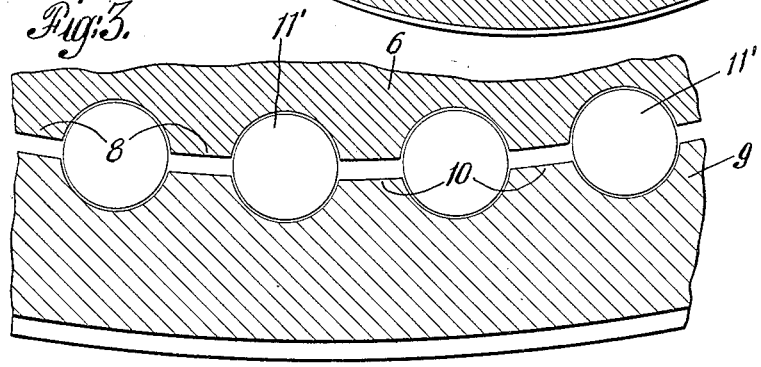
INVENTOR
Otto A. Banner
BY C. Campbell Heinicke
ATTORNEY Patented Nov. 28, 1933

1,936,574

UNITED STATES PATENT OFFICE 1,936,574

ROLLER COUPLING

Otto A. Banner, Highland Park, N. J.

Application December 4, 1931. Serial No. 579,006

5 Claims. (Cl. 64—92)

This invention relates to couplings.

In the joining of two shafts by a coupling the problem is relatively simple provided the shafts are accurately alined; due to wear and other causes such is not generally the case. This misalinement takes two forms either parallel, that is, the shafts are parallel but the centers are not in a line or the shafts are not parallel but form an angle. In either event the coupling must be capable not only of transmitting the power but must also be capable of adjusting itself so as to take care of such misalinement. Various types of couplings have been invented to accomplish such result.

In addition, a coupling should be capable of assembly in close quarters. Couplings that are capable of taking care of considerable misalinement are generally of considerable bulk and hence require a relatively large area about them in order to assemble and couple them on the shafts, which also increases the cost for the coupling. Still another requirement is that the coupling shall have a long life which requires a simple type of construction properly lubricated.

One of the objects of this invention is to provide a coupling that will transmit power from one shaft to another. Still another object of the invention is to provide a coupling that will transmit power from one shaft to another when the shafts are misalined in a greater degree of misalinement than is generally possible with any non-flexible positively driven coupling. Still another object of the invention is to provide a coupling that can be manufactured by standard machines and tools and having the minimum weight of metal to transmit the required power. A still further object of the invention is to provide a coupling that can be assembled in closer quarters than is generally possible for couplings of the same type.

Referring to the drawings:

Figure 2 is a cross sectional view of Figure 1 along the line 2, 2, of Figure 1, looking in the direction of the arrows.

Figure 3 is an enlarged detail view of a portion of Figure 2, showing the rollers and teeth.

Figure 1:
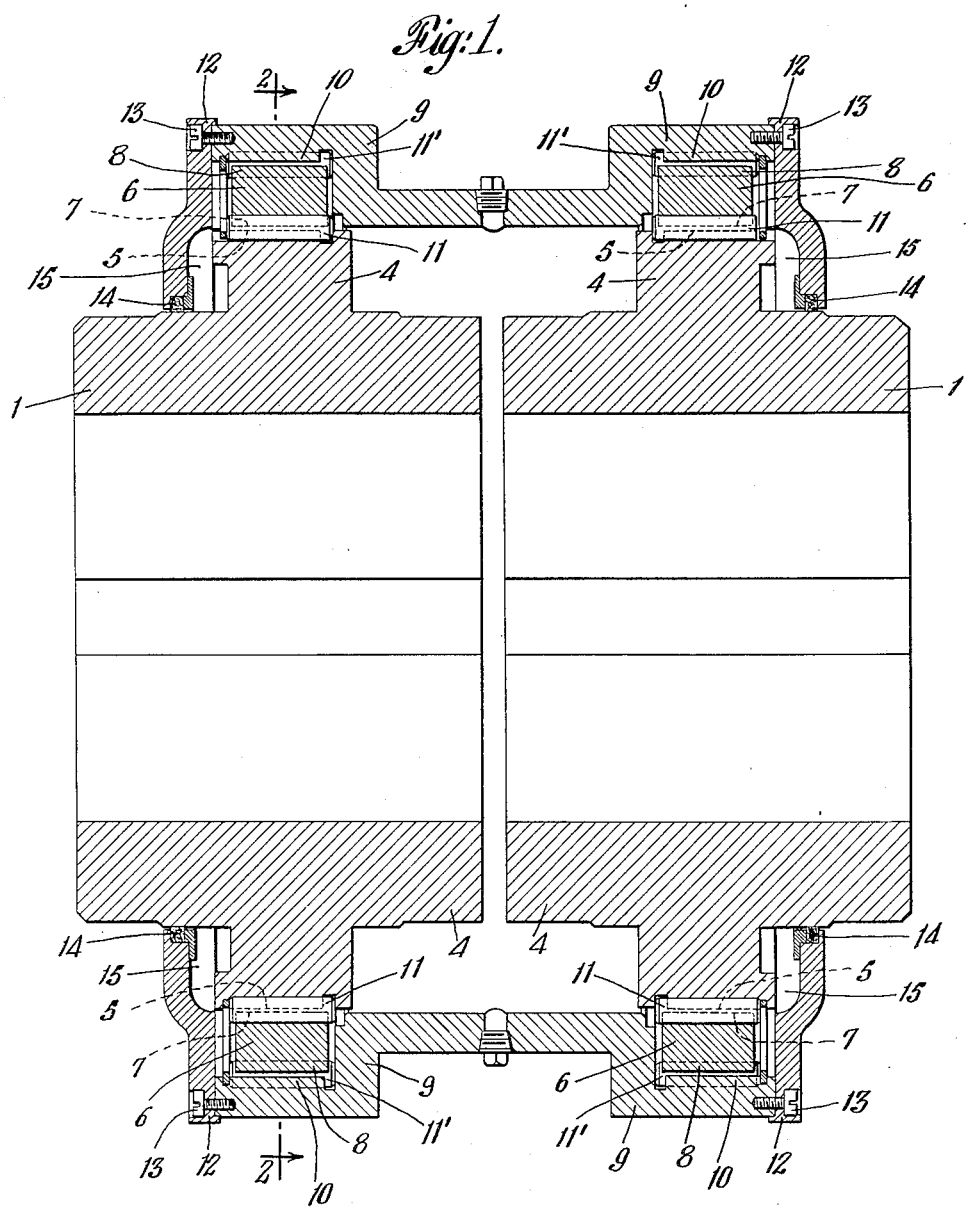
Figure 1 is a longitudinal sectional view of a coupling embodying the principles of my invention.

In carrying out my invention, I propose to provide hubs 1 secured in any well known manner such as by keys 2 to the shafts. Hubs 1 centrally thereof have disks 4 integral therewith. The periphery of disks 4 have teeth 5 formed therein. Torque rings 6 have internal teeth 7 and external teeth 8. A cover 9 also has internal teeth 10 for each torque ring 6. The teeth of the hubs, torque ring and cover, have semi-circular depressions to receive rollers 11, 11'. Cover 9 is of one piece. This is possible because of the compactness of the coupling. Cover 9 has end plates 12 secured to cover 9 in any well known manner such as by bolts 13. End plates 12 are adapted to frictionally engage hubs 4. At the base of plates 12 are oil retaining rings 14 to retain lubricant in chambers 15 formed in disks 4 and cover end plates 12 and cover plate 9.

There is but slight clearance between the rollers 11, 11' and the end plates 12 so that in the event of misalinement the end plates 12 tend to hold the rollers 11 and 12 to tilt with cover 9 in teeth 8 and 10 and teeth 5 and 7. When the misalinement is increased until the clearances are no longer sufficient the rollers 11' bind in teeth 8 and 10, then rings 6 also tilt with cover 9 and rollers 11, 11'. It is apparent that the degree of misalinement capable of being taken care of by the coupling is dependent upon the clearances of the different teeth and the rollers and the clearance between the rollers and the cover plate. The degree of misalinement that can be taken care of is increased over that of a gear coupling wherein there would be a direct drive between the teeth of the torque ring and the hub teeth and cover teeth which permits of either the decrease in the size of the coupling or an increase in the amount of misalinement that can be taken care of by the same size coupling.

I further propose to make the rollers of hard material such as chrome molybdenum steel or nitralloy. Hard rubber may be substituted where a flexible coupling is desired for the roller material.

A proper lubrication for a long life must be secured and I provide for such lubrication by chambers 15 to contain a sufficient amount of lubricant. In addition, the oil film if of proper thickness permits of teeth and rollers contacting throughout the circumference thereby increasing the effective strength of the coupling.

As the cover plates 12 can be readily removed, it is possible to assemble the coupling in spaces where the usual coupling could not be conveniently applied. As the distances required between the sets of teeth on each hub is relatively small the cover plate can be made in one piece and the weight of the hubs can be reduced to the minimum required and as the major part of the coupling can be made from the usual materials and only the rollers need to be of expensive material and all parts can be made with standard tools and machine, the coupling can be manufactured relatively cheap.

It will thus be seen that I have invented a form of coupling that will have a long life, relatively cheap to manufacture, and one which will take care of a greater degree of misalinement than couplings of the same size of the usual gear type.

What I claim is:

1. In a shaft coupling comprising two hubs having external spaced recesses, torque rings having internal and external spaced recesses surrounding said hub recesses, a cover surrounding said hubs and said rings and having internal spaced recesses, cylindrical torque transmitting elements in said radially alined recesses, spaced abutments within said cover to permit the cover to tilt with respect to said torque rings, said abutments in predetermined spaced relationship with respect to said torque rings to tilt said torque rings with said cover when said cover has tilted beyond a predetermined angle with respect to said hubs.

2. In a shaft coupling, two hubs, rings surrounding said hubs, a cover surrounding said rings and hubs, cylindrical torque connectors between said hubs and rings and said rings and cover, abutments within said cover to permit angular tilting of said torque rings and cylindrical connectors within a limited angle.

3. In a shaft coupling, two hubs having external spaced recesses, torque rings having internal and external spaced recesses surrounding said hub recesses, a cover surrounding said hubs and said rings having internal spaced recesses, cylindrical torque transmitting elements in said recesses, radial extensions in said cover forming spaced abutments to permit angular inclination of the torque rings and cylindrical torque transmitting elements to a limited amount with reference to the hub and cover gears.

4. In a shaft coupling comprising two hubs having external spaced recesses in each hub, rings having internal and external spaced recesses surrounding said hub recesses, a cover surrounding said hubs and said rings and having internal spaced recesses, cylindrical elements in said recesses to transmit torque between said hubs and rings and said rings and cover, and means carried by said cover whereby the angular inclination of the radial plane of the rings with reference to the hub and cover gears is limited.

5. In a shaft coupling comprising two hubs, rings on said hubs, a cover, cylindrical connectors between said hubs and said rings and said rings and said cover, said rings and said connectors tiltable with respect to said hubs and cover and means to limit the angular inclination of the rings with respect to said cover to a predetermined amount when the coupling is misalined.

OTTO A. BANNER.